Reissued July 6, 1943

Re. 22,340

UNITED STATES PATENT OFFICE 22,340

INSECTICIDAL COMPOSITION

Clarence D. Dolman, Wenatchee, Wash., assignor to Hercules Glue Company, a corporation of California No Drawing. Original No. 2,195,696, dated April 2, 1940, Serial No. 236,562, October 22, 1938. Application for reissue April 1, 1941, Serial No. 386,383

14 Claims. (Cl. 167—42)

This invention relates to a spray composition and more particularly to a composition which contributes an improved wetting, spreading and sticking characteristic to an aqueous spray carrying substantially water insoluble solid insecticides in suspension. The present application is a continuation in part of my prior application Serial Nos. 65,109 filed February 21, 1936, and 102,537 filed September 25, 1936, and 131,176 filed March 16, 1937.

In Patent No. 2,018,681 of October 29, 1935, Littooy and Lindstaedt have disclosed that the deposit of a toxic substance, particularly water insoluble inorganic insecticides, can be enhanced if the insecticide is mixed with an unctuous or an oleaginous material. I have determined that to secure the most beneficial result the oily insecticide should be used in a spray tank mix having a certain adjusted pH value which value is maintained so long as the material is present in the spray tank. I have found that the tank mix should be maintained between the values of pH 6.8 to 7.2 and that this pH range can be extended between the values of pH 6 and pH 8 and a fair deposit secured. Beyond these, the deposit is not satisfactory.

Utilizing a spray tank mix of this invention, I have been able to apply a continuous and uniform deposit to fruit of the order of 2000 micrograms. That is each square inch had substantially the same weight deposit even though one was at the stem end of the fruit and the other at the calyx. Also the weight deposit per square inch was substantially uniform in thickness.

The deposit applied is cumulative. That is, under satisfactory operating conditions, if one continues to spray the fruit, the deposit continues to build up, and I have placed such heavy deposits upon apples, for example, that the apple appeared as a solid white ball, as if it had been dipped in tallow and then cooled.

It is a further feature of the spray tank mix of this invention that the deposit of insecticide does not wash off the fruit, but is strongly adherent thereto. In fact, in one test, an investigator actually sprayed the fruit, and, immediately after spraying, placed the fruit under a faucet in an unsuccessful attempt to wash off the deposit of insecticide with the stream of water flowing from the faucet. This of course represents an extreme condition, one that would not be met in practice. However, in actual use the mixture of the present invention deposits the insecticide upon the fruit and vegetation so that subsequently it is not washed off by fog, dew or rain. The composition, upon contact with the fruit, releases the water used as a carrier and leaves the insecticide strongly adherent to the fruit and to deposited layers of insecticide.

It is the discovery of the present invention that fatty acids have a high adsorbent capacity for the solid surfaces involved, that is, between the surface of the fruit, for example, and a substantially water insoluble inorganic insecticide, as well as between a deposited layer of the insecticide and freshly applied insecticide. However, as I have previously mentioned, this property of the fatty acid is critical and pH adjustments in the spray tank mix must be observed. Thus while a fatty acid alone can be incorporated with the insecticide in the laboratory successfully, in the field it is necessary to adjust the pH of the mixture by the addition of suitable materials.

The present invention is concerned with coating of the water insoluble solid insecticide with a material of such a nature that the insecticide particles have an increased affinity, adsorption value for, or ability to adhere to, a solid surface. The spray mix made up according to this invention is not an emulsion. Instead, it is a mechanically sustained suspension in which the insecticidal particles appear in a flocculated condition. It is necessary to maintain certain pH conditions in the spray mix, otherwise the mixture becomes incompatible in that if it becomes too alkaline the insecticide will not be properly deposited on the fruit and may be released and deposited upon the sides and the bottom of the tank while if the mix becomes too acid, the oil is released and comes out on the top of the tank mix.

As the substantially water insoluble solid insecticide coating material increasing the adherence of the insecticide, I have successfully used fatty acids or oils having a fatty acid content, such as vegetable oils, fish oils such as dogfish oil, herring oil, sardine oil and the like. I have also successfully used fatty acids, both saturated and unsaturated. I have successfully used oleic acid but I can also use other acids such as lauric, myristic, palmitic and stearic acids. These are the best known of the higher fatty acids and are cited by way of example and not by way of limitation as to fatty acids which can be utilized.

The use of oleic acid has heretofore been thought detrimental. In a publication of the Department of Agriculture in 1926, Hood stated that stickers utilizing oleic acid were detrimental inasmuch as they burned fruit and trees. This view has ever since persisted. I have found that fatty acids can be utilized successfully without a detrimental effect on fruit or vegetation and that thereby certain unexpected novel results can be secured. For example, prior art compositions including soaps or stickers left a maximum deposit of about 150 micrograms of insecticide on each square inch of a fruit. These compositions did not give uniform coverage, and the spray ran off the fruit, particularly if dew rose, fog occurred, or rain fell. Compositions utilizing the material of the Littooy Patent No. 1,898,673 of February 21, 1933, and known to the trade as "Fluxit," a calcium caseinate containing excess calcium, gave a maximum deposit of the order of 100 micrograms, although the cover was substantially uniform. The spray mix of this invention enables a deposit to be placed upon the fruit which is approximately directly proportional to the length of time that the fruit is sprayed and which is also uniform and continuous. That is, the longer the fruit is sprayed the heavier the deposit, and fruit sprayed for thirty seconds has substantially twice as much weight deposit per unit area as fruit sprayed for fifteen seconds. With prior art materials this was not possible; once the limit of the weight per unit area had been reached further spraying was useless for the material ran off. That is, materials depending upon "Fluxit" as the spreader and sticker could not deposit more than 100 micrograms per square inch, while other prior art compositions did not exceed 150 micrograms per square inch. With the material of the present invention, I have been able to secure consistently a deposit of 2000 micrograms per square inch at one spraying of the fruit.

The composition of the present invention contemplates both liquid and dry mixes. In the marketing of the material, it is sometimes more convenient to market a dry material than a liquid, and this invention successfully supplies useful materials of both kinds. In addition, I provide materials which are useful with astringent insecticides such as astringent lead arsenates which are lead arsenates containing electrolytes such as alum, zinc sulphate, or other impurities such as acetates or acetic acid See Patents 2,088,639, 2,088,640, and 2,088,641 of August 3, 1937.

In making up the spray mix conditioning material of the present invention, I have proceeded, for example, as follows:

*Example I*

To 5 gallons of oleic acid I add 12.6 gallons 100 viscosity spray oil and 32.6 gallons of a product known as 10 P Base oil. This product is on the order of a kerosene, having a 42.2 A. P. I. gravity, 102° F. flash in a closed cup, and, upon a distillation test, an initial of 312° F. and a final end point of 379° F. The hydrocarbon or mineral oil is added to cut the viscosity of the fatty acid. This oil may have some sticking value but mainly it is used as a diluent.

The products are mixed together by adding the oleic acid to the spray oil and then adding the 10 P Base oil. 1.12 gallons of ammonium hydroxide of a specific gravity of 0.9 are then slowly poured into the mixture. To get the best results the order of mixing stated should be followed. Sufficient denatured alcohol is then added to clear the mixture, or more oleic acid may be added for the same purpose. This usually takes from one-eighth to three-eights of a gallon to clear the mixture. A clear reddish brown mixture results. This mixture, upon dilution with a relatively large volume of water, say four times as much water, does not form the usual oil in water emulsion nor a soap solution; it forms a layer of a mixture containing water in oil which floats on top of the body of water.

I also make up the material as follows:

*Example II*

From 5–30% of a suitable fatty acid is dissolved in a suitable solvent such as a mineral oil and I have used various petroleum fractions including those in the range having a viscosity from slightly under that of kerosene to a true mineral oil having a viscosity of about 80 Saybolt and higher, as much as 95 Saybolt. It is not necessary that these oils be highly refined since the presence of an unsulfonatable residue is not material. I then thin the mixture with a solvent such as from 2–20% of denatured ethyl alcohol or methyl alcohol. This aids incorporation into the aqueous spray mix subsequently and various solvents can be used or they can be omitted.

After the solution of the acid and the oil has been made up I preferably saturate it with ammonia, passing in ammonia gas usually along with or in the presence of about 2% of moisture so that the ammonia has an opportunity to hydrolize and react with the acid to form an ammonium soap. In place of ammonia I can use a substituted ammonia such as an amine and I have successfully employed various amines including triethanolamine. At first, upon introduction of the ammonia, the mixture will cloud. Thereafter it will clear up and a clear miscible liquid results of a reddish brown color.

The compositions made up according to the foregoing disclosure before mixing with the insecticide and water will be found to have a pH between 6.5 and 9 and usually about 7.4, about 5–6% acid being present as oleic acid. The pH should be adjusted by addition of the acid or the soap so that it lies between these values. If the pH of the spray mixture goes below 6.5, homogeneity cannot be secured, while if it gets too alkaline the oil and insecticide separate out or the fruit is harmed in that a dry condition in the deposit results and the skin cells crack open.

If one of the foregoing compositions is added to the spray apparatus, in the hands of careless operators it will sometimes be found that a gum or a gummy deposit is formed, the insecticide being deposited in the apparatus instead of on the fruit. This is undesirable because the spray is being robbed of the effective material. To overcome this, I preferably add to the composition a small amount of a protective colloid, although this can be added to the spray tank. Casein, blood albumen, glue or the like can be added in powdered form in an amount from 0.1% to 0.5% of the mix.

It will sometimes be found that the casein precipitates. If this occurs, it can be removed, but it will be found that the casein has so modified the mix, leaving sufficient casein present to provide a protective colloid which prevents the undesirable gumming. The use of the protective colloid is not to maintain a suspension, for the present material is not a colloidal emulsion or suspension, and must be mechanically agitated in the spray tank in conjunction with the insecticide.

If a particularly heavy coverage is desired, a small amount of a zinc oleate or magnesium oleate can be dissolved in the oil. These have the effect of increasing to an even greater extent the weight deposit secured of the insecticide.

In practice, the conditioning material of this invention is added to the spray tank, usually in the proportion of about one-half pint to a quart of the liquid to each one hundred gallons of water. An insecticide, a water insoluble solid insecticide, is then added in the usual amount and the spray tank agitator started into operation. It will then be noted that the mixture is in mechanical suspension which is mechanically maintained by the agitator in the spray apparatus. The insecticide quantity will vary between one and eight pounds per 100 gallons, usually four pounds.

It is a feature of this invention that the spray conditioning material does not affect adversely the spray tank mixture if the conditioning material is used in excess. Thus an increase in the volume of conditioning material of over fifty percent in one spray tank mixture, resulted in an increase in the pH of only 0.02 on the pH scale, from 7.2 to 7.22. The conditioning material is therefore particularly suited for use by non-technical persons frequently found handling the spray tank work in orchards. It is not infrequently found that such persons will have the opinion that if a given amount of spray material will give good results, twice or three times as much ought to give even better results, whereupon they proceed to dump additional quantities into the spray tank. If the proportions are critical, the result is often disastrous for the orchardist will promptly blame the spray material and the spray material manufacturer will be faced with a damage suit, loss of business, as well as being in a position in which he cannot protect himself because he cannot determine if the orchardist failed to follow instructions.

Materials applied in accordance with this invention last, and are effective so long that the total number of spraying operations can be reduced. Thus, it is frequently necessary to apply in the course of a season as many as ten to fifteen sprays. I have successfully controlled on a large scale pest infestations by applying only five sprays during a season as against ten or fifteen usually necessary with the prior art materials to control the infestation. That I am able to do this is because the composition when applied to the fruit, has a certain elasticity or continuous film capacity so that even though the fruit changes somewhat in size and shape, the cover can stretch and does not break, providing open spaces in the cover through which worms or other pests can attack the fruit. It is this property which enables me to successfully reduce the number of spray applications, for without this the growth of the fruit would offset effectiveness of the spray, if the spray cover did not stretch.

While I have mentioned heretofore that I preferred to use a soap as the adjusting material, it is of course obvious that other materials compatible with the oil or fatty acids can be used and that oils having a suitable pH adjusting material can be used instead. For example, instead of the ammonia or substituted ammonia soaps, I can use alkali metal soaps, and I have successfully used a mixture of ammonia and potassium hydroxide in making up the soap. Some sodium soaps are insoluble in some mineral oils, and care must be exercised in the choice of the positive ion or in the choice of the solvent if a sodium soap is employed. Instead of soaps, other materials can be used which, in conjunction with the fatty acid, or the fatty acid containing oil, give the correct pH condition to the spray mix. After all, the problem, reduced to its barest essentials, is one of increasing the adherent quality of the substantially water insoluble solid insecticide under certain pH conditions. It is obvious to those skilled in the art and familiar with this disclosure that various pH adjusting materials can be used instead of the soaps which I have disclosed.

In the foregoing composition I disclosed the use of oleic acid and hydrocarbon oils. These do not have to be used together, and oleic acid can be used alone in conjunction with the saponified or esterified fatty material. The hydrocarbon oils have less absorptive imparting capacity for the water insoluble solid insecticide than does the fatty acid. I prefer to use the hydrocarbon and fatty material together, since the hydrocarbon oil facilitates distribution of the acid onto the insoluble solid insecticide and the fatty acid imparts or increases the absorptive or attaching capacity.

After all, what is desired is a certain pH condition in conjunction with an imparting of adherent properties to the water insoluble solid insecticide. Variation can be made in the proportion of the foregoing disclosed material so long as adherent capacity is imparted to the insecticide and the proper pH and surface tension conditions are maintained.

I have found that the use of one part of one of the compositions particularly described heretofore in conjunction with three parts of fish oil to be particularly effective, although generally equal parts of the conditioning material and the fish oil will be found to give successful results and I have used as little as one part of the fish oil to three of the conditioning material.

In some cases it will be found that because casein and soap tend to reluce the surface tension it is necessary to add an electrolyte to increase it and maintain the proper balance. Whether or not the proper surface tension is present can be readily determined by the way the spray acts when it strikes the fruit. If the surface tension is too low, the material will tend to run off the fruit rapidly. In this case, it is necessary to add a small amount of an electrolyte such as zinc sulphate, alum or the like, or any of the usual well-known electrolytes. Thus while I prefer to use ammonium oleate, casein and zinc sulphate in the composition, any suitable pH conditioning material compatible with the protective colloid, if such be present, can be used. Any electrolyte can be employed as long as the proper pH and surface tension conditions are maintained thereby. Those skilled in the art will have no difficulty in practicing the invention in view of the disclosure made herein. The electrolyte should be such as to buffer the material.

The adherent imparting material for the water insoluble inorganic insecticide together with the pH conditioning material, if such be present, can be carried in solution in a solvent as a hydrocarbon oil if it is desired to use a liquid material or the whole material can be absorbed on an inert material so that a dry powder is obtained.

The fatty acids employed are taken from the classes represented by the following:

$C_nH_{2n+1}.COOH$ where $n$ is greater than 5
$C_nH_{2n-1}.COOH$
$C_nH_{2n-3}.COOH$
$C_nH_{2n-5}.COOH$ Acids within the classes are numerous and include lauric, palmitic, stearic, oleic, linoleic and linolinic acid—see Hackh's Chemical Dictionary, 1st ed. pages 292–293 for a more complete list which is incorporated here by reference.

The fatty acids are not used as such entirely but are partially reacted to give soaps or esters.

The sodium, potassium, ammonia, lead and zinc soaps can be used; in fact any metal can be used to saponify the acid so long as the resultant soap is soluble in the mineral oil solvent. In place of ammonia, any amine can be employed so long as it includes a reactive hydroxyl group to form an ester with the fatty acid.

The acids can be reacted with alkyl alcohols to form esters or with available hydroxyl containing alkyl compounds to form esters. As such alcohols I can use any mono, di or tri-hydric alkyl alcohol, particularly glycerol, the various glycols, including ethylene and propylene glycol to form such typically useful compounds as diglycol oleate, stearate or laurate, the glyceryl stearate, oleate or laurate. The alkylolamines (see Patent 1,799,823) particularly the ethanolamines, mono-, di-, and tri-, are useful and are particularly successful herein but any alkylolamine of an aliphatic acid can be employed, whether the acid be saturated or unsaturated. Based upon the quantity of insecticide present the total fatty acid content is quite small, usually from 0.1% to 5% of the insecticide present.

It is a feature of the invention that the fluosilicate and other fluorine containing insecticides can be successfully applied with the composition of this invention. Another outstanding feature of the invention is that the present composition vastly improves the deposit of astringent lead arsenate.

I have heretofore discussed herein insecticides which I class as water insoluble solid insecticides. These include the arsenic insecticides as lead and calcium arsenates, zinc arsenite, the fluorine containing insecticides such as cryolite and barium fluosilicate. These materials are insoluble, or substantially so, in water. The effectiveness of the present materials depends apparently upon a wetting of the insecticide particles preferentially by the oil. At the pH values indicated, this effect is at a maximum. This utility is not present with organic materials or with non-metallic materials for diatomaceous earth, substituted as the insecticide, is not deposited when sprayed as the insecticide.

I have heretofore stated that the tank mix can have a pH value between 6 and 8. This of course refers to the mix sprayed in this instance wherein materials making up the compositions of the present invention are injected by suitable means directly into the spray line. And hereinbefore, wherein I have referred to tank mixes, this of course includes the case of injection of any one or more materials, dry or wet, into the spray line to give a spray mixture within this invention even though no tank is employed.

The pH of the spray should not exceed 8 for the further reason that as one employs a spray having a more alkaline pH, a dry condition of the deposit on the fruit results, and more or less serious cracking of the fruit skin cells occurs. This condition in turn makes for difficult cleaning; oftentimes it is so serious as to render the fruit unmarketable.

The weight deposit of 2000 micrograms per square inch is only mentioned hereinbefore as illustrative and not as a limitation on the weight deposits possible with this invention. As a matter of fact, the weight deposits of insecticide can be built up, since the spray deposit is practically cumulative until the total deposit equals and exceeds that of the fruit. While such deposits are impracticable, they are mentioned to illustrate the possibilities of the present invention.

The simplest spray composition employing the present invention is one including (1) the finely divided solid metallic insecticide dispersed in water, in an insecticidally effective concentration, (2) together with sufficient free fatty acid to impart the desirable adsorption properties to the insecticide while the pH of the spray mix is between 6 and 8. With some waters, no pH adjustment need be practiced; with other waters pH adjustment is necessary and the use of the previously described compositions which inherently give pH's between 6 and 8 is desirable. Instead of using the previously mentioned saponified or esterified fatty acid materials, the pH adjustment can be achieved (1) by preconditioning of the water employed to ensure that when the insecticide and fatty acid are added the spray mix will have a pH of 6 to 8, or (2) by utilizing such alkaline or acid salts to adjust the pH—for example employing mixtures of sodium or potassium carbonate-bicarbonate, soda ash, alkali metal normal and acid phosphates, borates, acetates, formates, phthalates, benzoates and mixtures thereof, and other materials, as is well known in the art. These will buffer the water. At the same time some saponification or esterification can occur with the fatty acid to form soaps and esters. While these will affect the pH and facilitate its control, the primary adjustment is by addition of the salts indicated. The addition of the fatty acid must take into account, in these instances, that quantity used up in saponification or esterification reactions with the buffering or pH adjusting materials.

*Example III*

The following spray composition has also been used successfully; the proportions are for a 1000 gallon mix:

*Solution No. 1.*—Make a mixture containing ½ pint of oleic acid to each gallon of mineral oil (unemulsified).

*Solution No. 2.*—Dissolve or mix thoroughly 100 ounces of sodium silicate or water glass in seven (7) gallons of water.

1. Mix lead arsenate to a thin paste and wash into tank up to level of the paddles.
2. Add 5 gallons Solution No. 1.
3. Add 1 quart Solution No. 2.
4. Fill tank with water.

II. Or 5 gallons mineral oil containing 5% oleic acid (for 1000 gals.). Spray may be mixed without emulsification with at least 30 lbs. lead made into thin paste with $H_2O$ (water).

Oleic acid when used as a spreader should be used at the rate of ½ pint per 100 gallons of spray solution. First, the lead arsenate should be mixed to a thin paste. Second, the oleic acid should then be stirred in until no oil or brownish coloration is visible. At least 3 lbs. of lead should be used with each ½ pint of oleic acid.

The above composition illustrates the successful use of sodium compounds and sodium soaps.

Based on the quantity of insecticide present (which I have previously indicated can vary between one and eight pounds per 100 gallons) the free fatty acid content can be varied between 0.1% and as much as 70% and more, though 20% usually suffices as a maximum.

For the sake of clarity and completeness I believe it well to indicate the relatively small weight percentages of the soap and free acid which are present in the spray tank composition. For example, I have stated that to each 100 gallons of water (830 pounds) is added a total of from a half to four pounds of mineral oil and a fatty acid soap or ester. The half to four pounds of fatty acid and mineral oil refers to the total and not the separate weights of these two materials. I have further stated that of this total of a half to four pounds, 5% to 30% is fatty acid and the balance mineral oil. This means that as little at 0.003% of the water is total fatty acid (5% of half a pound in 830 pounds) and that of this as little as a half of one per cent is free acid. Thus, the free acid content is as little as 0.0003% (0.5% of half a pound in 830 pounds). When it is pointed out that the fatty acid is employed to affect the interfacial tension between the solid insoluble insecticide, the water and the fruit surface and that its mechanism is a molecular one, the utilization of such a small quantity can be understood. (0.0003% is equivalent to 0.025 pound in 830 pounds of water.)

I claim:

1. A spray composition made up by mixing materials proportionately comprising about 100 gallons of water containing (1) from about one-half to about four pounds of a fatty acid soft soap and a mineral oil having a viscosity from slightly under that of kerosene to about 95 Saybolt, the fatty acid content totalling from about 5 to 30% of the mineral oil, said fatty acid content being only partially saponified so as to leave a free fatty acid content of from ½% to 20%, and (2) a substantially water insoluble finely divided solid inorganic metal salt insecticide suspended in the water in an insecticidally effective concentration.

2. A spray composition made up by mixing materials proportionately comprising about 100 gallons of water containing (1) from about one-half to about four pounds of a fatty acid saponified with a material selected from the group consisting of an ethanolamine and ammonia and a mineral oil having a viscosity from slightly under that of kerosene to about 95 Saybolt, the fatty acid content totalling from about 5% to 30% of the mineral oil and being saponified only partially to leave a free acid content of at least ½%, and (2) a substantially water insoluble inorganic metal salt insecticide suspended in the water in an insecticidally effective concentration.

3. A spray composition made up by mixing materials proportionately comprising about 100 gallons of water containing (1) from about one-half to about four pounds of triethanolamine oleate and a mineral oil having a viscosity from slightly under that of kerosene to about 95 Saybolt, the oleic acid content totalling from about 5% to 30% of the mineral oil and being saponified only partially to leave a free acid content of at least ½% and (2) a substantially water insoluble inorganic metal salt insecticide suspended in the water in an insecticidally effective concentration.

4. A spray composition made up by mixing materials proportionately comprising about 100 gallons of water containing (1) from about one-half to about four pounds of a fatty acid soft soap and a mineral oil having a viscosity from slightly under that of kerosene to about 95 Saybolt, the fatty acid content totalling from about 5% to 30% of the mineral oil and being saponified only partially to leave from ½% to 20% free acid, and (2) an inorganic arsenate insecticide suspended in the water in an insecticidally effective concentration.

5. A spray composition made up by mixing materials proportionately comprising about 100 gallons of water containing (1) from about one-half to about four pounds of a fatty acid soft soap and a mineral oil having a viscosity from slightly under that of kerosene to about 95 Saybolt, the fatty acid content totalling from about 5% to 30% of the mineral oil and being saponified only partially to leave from ½% to 20% free acid, and (2) a lead arsenate insecticide suspended in the water in an insecticidally effective concentration.

6. A spray composition made up by mixing materials proportionately comprising about 100 gallons of water containing (1) from about one-half to about four pounds of a fatty acid soft soap and a mineral oil having a viscosity from slightly under that of kerosene to about 95 Saybolt, the fatty acid content totalling from about 5% to 30% of the mineral oil and being saponified only partially to leave from ½% to 20% free acid, and (2) a calcium arsenate insecticide suspended in the water in an insecticidally effective concentration.

7. A spray composition made up by mixing materials proportionately comprising about 100 gallons of water containing (1) from about one-half to about four pounds of a fatty acid soft soap and a mineral oil having a viscosity from slightly under that of kerosene to about 95 Saybolt, the fatty acid content totalling from about 5% to 30% of the mineral oil and being saponified only partially to leace from ½% to 20% free acid, and (2) a cryolite insecticide suspended in the water in an insecticidally effective concentration.

8. A spray composition made up by mixing materials proportionately comprising about 100 gallons of water, a substantially water insoluble inorganic metal salt insecticide present in an effective insecticidal concentration, and from about one-half to about four pounds of a mixture of an oil solution of a fatty acid soap and a fish oil, the mixture containing one volume of the soap-oil solution to from one-third to three volumes of fish oil and the fatty acid content being from about 5% to 30% of said oil solution with from ½% to 20% unsaponified acid in the composition.

9. A spray composition made up by mixing materials proportionately comprising about 100 gallons of water, a substantially water insoluble inorganic metal salt insecticide present in an effective insecticidal concentration, and from about one-half to about four pounds of a mixture of an oil solution of a fish oil containing free fatty acid and a material selected from the group consisting of an esterified fatty acid and a saponified fatty acid, the mixture containing one volume of the soap-oil solution to from one-third to three volumes of fish oil and the fatty acid content being from about 5% to 30% of said oil solution with from ½% to 20% unsaponified acid in the composition.

10. A spray composition made up by mixing materials proportionately comprising about 100 gallons of water, a substantially water insoluble inorganic metal salt insecticide present in an effective insecticidal concentration, and from about one-half to about four pounds of a mixture of a mineral oil solution of a fatty acid soap and a fish oil, the mixture containing one volume of the soap-oil solution to from one-third to three volumes of fish oil and the fatty acid content being from about 5% to 30% of the mineral oil solution with from ½% to 20% unsaponified acid in the composition, said soap being composed of a fatty acid saponified with an ethanolamine.

11. A spray composition made up by mixing materials proportionately comprising about 100 gallons of water, a substantially water insoluble inorganic metal salt insecticide present in an effective insecticidal concentration, and from about one-half pound to about four pounds of a mixture of a mineral oil solution of a fatty acid soap and a fish oil, the mixture containing one volume of the soap-oil solution to from one-third to three volumes of fish oil and the fatty acid content being from about 5% to 30% of the mineral oil, said soap being composed of a fatty acid saponified with triethanolamine to leave from ½% to 20% free acid in the mixture.

12. A spray composition made up by mixing materials proportionately comprising about 100 gallons of water, a substantially water insoluble inorganic metal salt insecticide, present in an effective insecticidal concentration, about 0.1 pound of a protective colloid and from about one-half to about four pounds of a mixture of a mineral oil solution of a fatty acid soap and a fish oil, the mixture containing one volume of the soap-oil solution to from one-third to three volumes of fish oil and the fatty acid content being from about 5% to 30% of the mineral oil with from ½% to 20% of the fatty acid unsaponified.

13. A spray composition made up by mixing materials proportionately comprising about 100 gallons of water, a substantially water insoluble inorganic metal salt insecticide present in an effective insecticidal concentration, about 0.1 pound of casein, and from about one-half pound to about four pounds of a mixture of a mineral oil solution of a fatty acid soap and a fish oil, the mixture containing one volume of the soap-oil solution to from one-third to three volumes of fish oil and the fatty acid content being from about 5% to 30% of the mineral oil with from ½% to 20% of the fatty acid unsaponified.

14. A spray composition made up by mixing materials proportionately comprising about 100 gallons of water, a substantially water insoluble inorganic metal salt insecticide present in an effective insecticidal concentration, about 0.1 pound of casein, and from about one-half pound to about four pounds of a mixture of a mineral oil solution of a fatty acid soap and a fish oil, the mixture containing one volume of the soap-oil solution to from one-third to three volumes of fish oil and the fatty acid content being from about 5% to 30% of the mineral oil, said soap being composed of a fatty acid saponified with triethanolamine to leave from ½% to 20% free acid in the mixture.

CLARENCE D. DOLMAN.